Patented Sept. 4, 1945

2,384,008

UNITED STATES PATENT OFFICE 2,384,008

METHOD FOR CONVERTING HYDROUS MAGNESIAN SILICATES INTO BASIC PRODUCTS

Hellmuth R. Brandenburg, Cowell, Calif., assignor to Idaho Maryland Mines Corporation, San Francisco, Calif., a corporation of Nevada No Drawing. Application September 19, 1942, Serial No. 459,044

9 Claims. (Cl. 23—201)

The present invention relates to improvements in a method for converting hydrous magnesium silicates into basic products.

This invention also relates to the production of magnesium oxide by the calcination of unstable hydrous magnesium silicates, and is a continuation in part of my copending application on a Process for converting hydrous magnesium silicates into basic products, filed March 23, 1940, Serial No. 325,641.

Unstable hydrous magnesium silicates of the serpentine group in their natural or uncalcined form contain not more than 0.5% by weight of available magnesium oxide, and a dead burnt calcine of a silicate of this group may contain an even smaller percentage of available magnesium oxide than the uncalcined silicate.

However, as a result of considerable development work, I have discovered that by calcining unstable hydrous magnesium silicates of the serpentine group to a predetermined degree without dead burning, these silicates may be made to yield approximately 14% available magnesium oxide, and that by calcining these silicates to a similar degree in the presence of steam, they may be made to yield better than 16% available magnesium oxide.

Uncalcined silicates of this group contain about 13.86% by weight of water of combination, which is progressively lost when the calcination is carried on to a final dead burnt product. The residual water of combination, that is, the water of combination remaining in the material at any time during the process of calcination, may therefore be used as an index for determining the point at which the calcine is approaching the dead burnt condition.

The process of calcination results from the transfer of heat to the material under treatment, and this of course is a function of various factors such as the temperatures used, the period of time during which heat is transferred to the material, the mesh of the material, the depth of the bed under treatment, and the extent to which the material is agitated. Having a silicate ground to a predetermined mesh, of a predetermined bed thickness, and agitated under predetermined conditions, calcination to a point short of dead burning may be obtained by effecting the required heat transfer either at a relatively high temperature for a relatively short period of time, or at a lower temperature for a longer time. Regardless of the temperatures and other variable conditions under which calcination may be carried out, the residual water of combination, serves as an accurate index for determining the extent to which calcination has progressed, and by preliminarily determining the residual water of combination index at which a maximum quantity of magnesium oxide is available in the calcine, this factor or index may thereafter be used as an accurate check and control.

The use of steam during the calcination process in some way physically or chemically alters the material under treatment so as to produce a greater yield of available magnesium oxide under predetermined conditions or serves to accelerate the process under the same conditions.

My process is operative with all hydrous magnesium silicates which in their naturally occurring state and composition contain 10% to 20% of water of combination, chemically held, and are characterized by a $MgO/SiO_2$ ratio of 0.70, or higher. I also wish to include certain hydrous silicate combinations of nickel and magnesium such as genthite, garnierite and the like.

To determine the conditions under which an unstable hydrous magnesium silicate should be calcined in order to yield a maximum quantity of available magnesium oxide, a number of samples may be run through the process, each under different conditions. The mesh used, bed thickness, extent of agitation, time, temperature, and the residual water of combination should all be noted. Preferably the samples should be ground to about 200 mesh and calcined in any suitable container such as a small crucible. Although grinding to a finer mesh would accelerate the process, from a practical standpoint it would probably be uneconomical to grind much finer than this. Some of the samples should be calcined in the presence of steam, while others should be calcined without resorting to this expedient.

The following chart is illustrative of the conditions under which I have made numerous runs of a blend of serpentine rocks taken from various counties in California and combined in approximately equal amounts. In each instance, calcination was conducted in a pyrometer-controlled muffle with an average materials bed thickness of ⅜″. Steam, when used, was admitted by dropping water into a heated copper tube, the open end of which was projected into the furnace. The blend of serpentines used contained 13.86 percent by weight water of combination, and the serpentine was ground to approximately 200 mesh. I have found that the minimum surface area of each particle for the best results should be 250 centimeters square per gram at a mean specific gravity of 2.6 for the silicate rock. Each particle is considered spherical in shape and has a diameter of 74 microns or less if a finer grinding of the material proves economical.

| Temperature °F. | Time | | Water of combination remaining after calcining | Percentage of available magnesium oxide in the calcine | |
|---|---|---|---|---|---|
| | Hrs. | Min. | | Without steam | With steam |
| 1,000 | 3 | ---- | 9.50 | 1.58 | ------ |
| 1,000 | 4 | ---- | 6.82 | 5.93 | ------ |
| 1,100 | 1 | ---- | 5.40 | 7.02 | ------ |
| 1,100 | 1 | ---- | 5.76 | ------ | 7.86 |
| 1,100 | 2 | ---- | 3.06 | 9.20 | ------ |
| 1,100 | 2 | ---- | 3.00 | ------ | 10.31 |
| 1,100 | 3 | ---- | 2.60 | 11.18 | ------ |
| 1,100 | 3 | ---- | 2.91 | ------ | 12.46 |
| 1,100 | 4 | ---- | 1.42 | 13.20 | ------ |
| 1,100 | 4 | ---- | 1.78 | ------ | 15.26 |
| 1,200 | 0 | 30 | 4.96 | 8.47 | ------ |
| 1,200 | 0 | 30 | 5.41 | ------ | 10.10 |
| 1,200 | 1 | ---- | 1.48 | 11.34 | ------ |
| 1,200 | 1 | ---- | 1.29 | ------ | 13.72 |
| 1,200 | 1 | 30 | 1.08 | 12.52 | ------ |
| 1,200 | 1 | 30 | 1.17 | ------ | 14.16 |
| 1,200 | 2 | ---- | 0.94 | 13.70 | ------ |
| 1,200 | 2 | ---- | 1.22 | ------ | 16.05 |
| 1,300 | 1 | ---- | 1.02 | 13.60 | ------ |
| 1,300 | 1 | ---- | 1.44 | ------ | 15.55 |
| 1,400 | 0 | 20 | 1.46 | 12.15 | ------ |
| 1,400 | 0 | 20 | 1.37 | ------ | 14.30 |
| 1,400 | 0 | 30 | 0.78 | 12.26 | ------ |
| 1,400 | 0 | 30 | 1.01 | ------ | 14.60 |
| 1,500 | 0 | 10 | 0.97 | 13.10 | ------ |
| 1,500 | 0 | 20 | 0.11 | None | ------ |

The method resorted to in determining the available magnesium oxide content of the calcined samples was as follows: a predetermined quantity of each calcined sample was boiled under a reflux condenser in a 3% (by weight) solution of benzoic acid in approximately 180 proof alcohol. The magnesium oxide of the calcine will quickly dissolve in this solution with formation of magnesium benzoate. In the magnesium bearing alcoholic solution, magnesium oxide may be easily and speedily determined by evaporating the alcohol and carefully calcining until only magnesium oxide is left.

Another method of determining the available magnesium oxide in each calcined sample is to suspend a portion of the sample in water and pass carbon dioxide gas through the suspension, with the consequent formation of soluble magnesium bicarbonate. The magnesium bicarbonate bearing suspension is then filtered, and the filtrate boiled so as to drive out the loosely bonded carbon dioxide gas and precipitate a pure magnesium carbonate. The magnesium carbonate can then be filtered from the solution and ignited to form magnesium oxide.

From a practical standpoint, a yield of available magnesium oxide of less than 5.0% of the raw material is not acceptable, and therefore it may be seen from the above chart that calcination must be carried out under such conditions that the percentage of residual water of combination with reference to the water of combination contained in the raw material lies between 0.6% and 8.0%. The per cent of residual water of combination refers to the amount still retained by the calcine and which when fully ejected will result in a dead burned calcine, e. g. a calcine incapable of showing further loss on ignition.

From the foregoing chart, it will be noted that the best result is obtained by the use of a temperature of 1200° F. and a time factor of two hours, and therefore if desired these factors and the other conditions under which these runs were made, such as the mesh of the material, the bed thickness, and the degree of agitation, may be duplicated. To check whether the process is proceeding according to schedule, samples may be periodically taken from the kiln for the purpose of checking the residual water of combination with the water of combination index previously determined.

But from the above chart it is to be noted that an acceptable yield of available magnesium oxide may also be obtained by calcining at 1500° F. The use of relatively low temperatures is perhaps impractical, for the reason that the time required for calcination is too long to be within economical limits.

In actual practice, grinding may be effected in closed circuit by the wet process, and calcination may be effected in a standard rotary kiln. When the wet grinding process is used, and the material is fed in a wet condition into the kiln, the water content of the material and the temperatures used in calcining are sufficient to produce the steam required in making an additional quantity of magnesium oxide available. When the dry grinding process is used, either water or steam can be introduced into the kiln with the material. Care is taken that the calcine be discharged when the residual water of combination content equals not less than 0.5% loss on ignition (residual water of combination). The best results are obtained when the calcine shows a loss on ignition from 1.5% to 4.0%. The operative confines of the process lie within 0.5% and 8.0% residual water of combination (or loss on ignition). Any calcine showing 8.0% loss on ignition or under possesses a degree of basicity far in excess of the raw or uncalcined product.

The available magnesium oxide contained in the calcine resulting from my method of treatment can be obtained by the carbonation process above referred to, and can then be suitably treated to produce various magnesium salts or the magnesium metal. The calcine when treated with a suitable weak acid solution will form a water soluble salt. A water soluble salt may also be formed by treating the calcine with aqueous solutions of certain suitable salts, such as ferric chloride wherein water soluble magnesium chloride and ferric hydroxide are produced, or such as ammonium chloride. The calcine itself, because possessing basic properties, may be used as a filler for floor and roofing materials, as an ingredient of insecticides, as an ingredient of plasters and cements, and as a spray for laying dust in coal mines.

I claim:

1. The method of producing available magnesium oxide from a comminuted unstable hydrous magnesium silicate of the serpentine group, comprising: calcining said comminuted silicate in the presence of steam until the residual water of combination of the resulting calcine is from 0.6% to 8.0% as represented by loss on ignition.

2. The method of producing available magnesium oxide from a comminuated unstable hydrous magnesium silicate of the serpentine group, comprising: calcining said silicate at a temperature of from 900° F. to 1500° F. in the presence of steam until the residual water of combination contained in the calcine is from 0.6% to 8.0% as represented by loss on ignition.

3. The herein described process of obtaining available magnesium oxide from hydrous magnesium silicates which consists in grinding the material to a fine mesh, subjecting the material to superheated steam while agitating the material, and in calcining the material in the presence of steam at a temperature between 800° and 1500° F. until the material has a residual water of combination content of between 1.5 percent and 4.0 per cent.

4. The herein described process of obtaining available magnesium oxide from hydrous magnesium silicates which consists in reducing the material to particles having a diameter of 74 microns or less, subjecting the material to superheated steam while agitating the material, and in calcining the material in the presence of steam at a temperature between 800° and 1500° F. until the residual water of combination content equals not less than 0.5% or over 8.0% loss on ignition.

5. The herein described process of obtaining available magnesium oxide from hydrous magnesium silicates which consists in wet grinding the material to a fine mesh in which each particle has a surface area of 250 ctm. $^2$/gram, or over, subjecting the material to heat for converting the water into steam, agitating the material in the presence of the steam, and in raising the temperature until it lies between 800° and 1500° F. and maintaining this temperature until the material is partially calcined.

6. The herein described process of obtaining available magnesium oxide from serpentine which consists in grinding the material to a fine mesh, subjecting the material to superheated steam while agitating the material, and in calcining the material in the presence of steam at a temperature between 800° and 1500° F. until the material contains a residual water of combination content of between 0.6% and 8.0% as represented by loss on ignition.

7. The herein described proces of obtaining available magnesium oxide from serpentine which consists in reducing the material to particles having a diameter of 74 microns or less, subjecting the material to superheated steam while agitating the material, and in calcining the material in the presence of steam at a temperature between 800° and 1500° F. until the residual water of combination content equals not less than 0.5% or over 8.0% loss on ignition.

8. The herein described process of obtaining available magnesium oxide from serpentine which consists in wet grinding the material to a fine mesh in which each particle has a surface area of 250 ctm. $^2$/gram, or over subjecting the material to heat for converting the water into steam, agitating the material in the presence of steam, and in raising the temperature until it lies between 800° and 1500° F. and maintaining this temperature until the material contains a residual water of combination content of between 0.6% and 8.0% as represented by loss on ignition.

9. The herein described process of obtaining the optimum available magnesium oxide from hydrous magnesium silicates which consists in grinding the material to a fine mesh, subjecting the material to superheated steam while agitating the material, and in calcining the material in the presence of steam at a temperature between 800° and 1500° F. until the residual water of combination content equals between 1.5% to 4.0% loss on ignition.

HELLMUTH R. BRANDENBURG.